United States Patent

Garabedian

[11] 4,070,994
[45] Jan. 31, 1978

[54] MODIFICATION FOR SELECTIVELY OPERATING A FRACTION OF MULTIPLE ROTORS OF A ROTARY ENGINE

[75] Inventor: Arthur Garabedian, Fullerton, Calif.
[73] Assignee: Dudley B. Frank, Santa Ana, Calif.
[21] Appl. No.: 630,383
[22] Filed: Nov. 10, 1975
[51] Int. Cl.² .......... F02B 53/06; F02B 53/10
[52] U.S. Cl. ............... 123/8.07; 123/8.13; 123/198 F; 261/23 A
[58] Field of Search ........ 123/8.07, 8.13, 198 F; 261/23 A

[56] References Cited

U.S. PATENT DOCUMENTS

| | | | |
|---|---|---|---|
| 2,166,968 | 7/1939 | Ruhlin | 123/198 F |
| 2,315,183 | 3/1943 | Bicknell | 123/198 F |
| 2,623,617 | 12/1952 | Snyder | 123/198 F |
| 2,837,322 | 6/1958 | Thome | 261/23 A |
| 2,857,146 | 10/1958 | Carlson | 261/23 A |
| 2,875,742 | 3/1959 | Dolza | 123/198 F |
| 3,249,099 | 5/1966 | Saxby | 261/23 A |
| 3,359,952 | 12/1967 | Jones | 123/8.07 X |
| 3,412,716 | 11/1968 | Tausch | 123/8.13 X |
| 3,476,092 | 11/1969 | Yamamoto | 123/8.07 X |
| 3,578,116 | 5/1971 | Nakajima | 123/198 F |
| 3,698,371 | 10/1972 | Mitsuyama | 123/198 F |

FOREIGN PATENT DOCUMENTS

| | | | |
|---|---|---|---|
| 1,007,193 | 10/1965 | United Kingdom | 123/8.07 |

*Primary Examiner*—Clarence R. Gordon
*Attorney, Agent, or Firm*—Knobbe, Martens, Olson, Hubbard & Bear

[57] ABSTRACT

An easily installed modification is disclosed for selectively supplying fuel and air to all or only a fraction of the rotors in a multirotor rotary engine for substantially increasing the fuel economy efficiency of the engine while reducing the emission by-products produced by the engine. The modification system includes means for assuring normal engine idling and for assuring adequate lubrication of rotors during time periods when such rotors are not supplied with fuel or air for combustion.

9 Claims, 5 Drawing Figures

MODIFICATION FOR SELECTIVELY OPERATING A FRACTION OF MULTIPLE ROTORS OF A ROTARY ENGINE

BACKGROUND OF THE INVENTION

This invention applies to rotary engines and more particularly to a system for utilizing on a selective basis all or a fraction of the rotors in a multiple rotor rotary engine for producing output power.

Numerous attempts have been made in the prior art to selectively split reciprocating engines so that, in response to the power demand on such an engine, all or a portion of the reciprocating cylinders are used to produce output power. A particularly efficient and successful modification for such a reciprocating engine is shown in my previously filed patent application Ser. No. 503,718, filed on Sept. 6, 1974, entitled APPARATUS FOR MODIFYING AN INTERNAL COMBUSTION ENGINE now U.S. Pat. No. 4,019,479. Thus, the fundamental realization that, under differing load conditions, a multiple combustion chamber reciprocating engine can be operated most efficiently by altering the number of combustion chambers used to produce output power has been recognized for a period of time in the art. Different problems are encountered, however, in the use of engine splitting modifications for rotary engines, and particularly Wankel engines, and such have not been solved in the prior art.

Initially, rotary engines having multiple rotors in most cases will not idle satisfactorily unless all of the rotors are used to produce the power for idling. Thus, if only a portion of the rotors are supplied with fuel or air for combustion, the idling speed must be maintained at an excessive level, resulting in excessive wear on the engine and excessive fuel comsumption. If such an engine is adjusted to normal idling speeds, it will simply not operate.

It is known from my previous application in monitoring power demand from an engine for splitting the engine to monitor the vacuum in an intake manifold. Since the vacuum at idle is relatively high, such a monitoring system would normally require that only a portion of the multiple rotors be used for producing idling power. Thus, the prior art engine splitting modifications do not provide teachings which permit an efficient split rotary engine having normal idling characteristics.

The second significant problem in adapting prior art engine splitting techniques to rotary or Wankel engines is caused by the fact that rotary engines must be supplied, through the normal fuel intake manifold, a small quantity of oil to lubricate the apex seals on each of the rotors. The amount of oil supplied to the rotors in a rotary engine is normally controlled by the position of the carburetor throttle valve. Thus, throttle valve modifications used to split the engine would normally result in a failure to properly lubricate those rotors which are not being used at a particular time to produce output power, which would result in severe damage to the rotary engine.

SUMMARY OF THE INVENTION

The present invention successfully accomplishes the splitting of a multirotor rotary engine to utilize all or a fraction of the rotors for producing power in response to power demand monitored by manifold vacuum. This is accomplished through a solution of the idling and lubrication problems encountered in such a modification.

The engine splitting technique of the present invention presupposes a split intake manifold wherein separate intake manifold conduits supply fuel and air to separate rotors or groups of rotors and wherein a carburetor is attached to each of the intake manifold conduits. In most applications, the carburetor will be a multiple barrel carburetor with one or more barrels supplying a fuel-air mixture to each of the intake conduits. In my filed application cited above the throttle valve controlling airflow to one of the intake conduits is manually controlled through a linkage to the accelerator pedal in the vehicle. The remaining throttle valve is controlled by a vacuum transducer which is connected by a vacuum line to the intake conduit, which is manually controlled. In such a system engine load or power demand is monitored by the vacuum level within the manually controlled intake conduit. When the engine demand is high, the vacuum in this manifold will be relatively low, causing, through a vacuum transducer, the opening of the throttle valve in the remaining intake conduit so that each of the combustion chambers is activated to produce power when required. When the vacuum in the manually controlled intake conduit is relatively high, as will occur, for example, at cruising speeds or at idle, the vacuum controlled intake conduit throttle valve is closed by the vacuum transducer so that only a portion of the combustion chambers are utilized to produce output power.

The present invention permits control of both the throttle valve and the fuel supply for the vacuum controlled intake conduit to meet peak engine demands and to permit only a portion of the rotors in a rotary engine to function at cruising speeds, while providing normal idling utilizing combustion in all combustion chambers. This is accomplished by controlling the throttle valve in the vacuum controlled intake conduit in a manner similar to my prior invention cited above, that is, by connecting the throttle valve to a vacuum transducer connected to the manually controlled intake conduit. The fuel supply for the vacuum controlled conduit, however, is controlled through a vacuum transducer which is connected to the manually controlled intake conduit at a location upstream of the throttle control valve. Since the manually controlled throttle valve is closed at idle and fuel is supplied to the manually controlled conduit through idle jets positioned downstream of the throttle valve, atmospheric pressure exists at the off-idle location upstream of the throttle valve. This atmospheric pressure, when supplied to the vacuum transducer controlling the fuel flow in the vacuum controlled intake conduit, will cause, at idle, a flow of fuel to the idle jets in the vacuum controlled conduit so that all rotors will be supplied fuel during idling conditions.

Furthermore, by placing the vacuum controlled fuel valve in the fuel supply line between the carburetor fuel reservoir and both the main operating and idle jets, all fuel supply is interrupted in response to high pressure in the off-idle position of the manually controlled conduit, so that fuel leakage through the idle jet inlet which would cause sporadic firing of the vacuum controlled rotors is prohibited. Since such sporadic firing would unnecessarily increase emissions from the engine, this direct control of fuel supply to both jets reduces the emission levels of the engine during control cycling.

It is common in rotary engines to supply oil directly into the inlet fuel-air mixture within the carburetor to lubricate the apex seals of the rotors. Since the oil is most advantageously supplied in proportion to the rotary speed and load of the engine, it has been common to operate an oil control valve from the throttle valve linkage, the position of which approximates these engine characteristics. This oil control valve normally operates from the end of the throttle linkage opposite the end connected to the accelerator linkage. Once a carburetor of this type has been modified so that the throttle control linkage for the vacuum controlled conduit operates independently of the manually controlled throttle valve, the oiling system for the rotors will no longer function properly. The present invention directly connects the oil control valve for all rotors to the manually controlled throttle linkage to supply lubricating oil to all of the rotors regardless of whether combustion occurs in some rotors, so that proper lubrication of all rotors at all speeds is assured.

These and other advantages of the present invention are best understood through a reference to the drawings in which.

DETAILED DESCRIPTION OF THE PREFERRED EMBODIMENT

Figure 1:
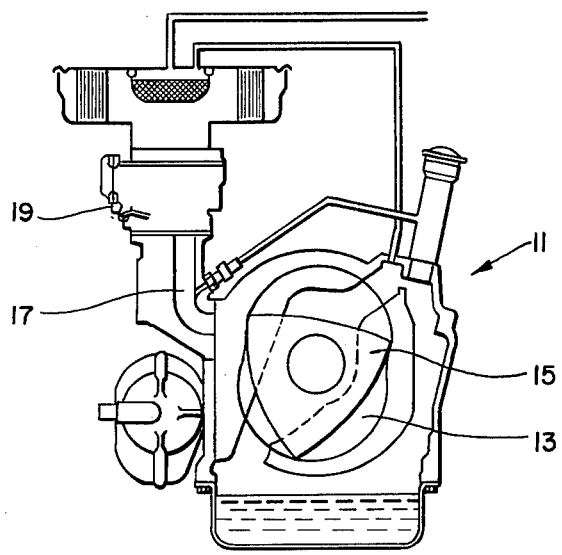
FIG. 1 is a schematic sectional illustration of a rotary engine, supplied with fuel by a carburetor modified according to the present invention.

Referring initially to FIG. 1, a rotary engine 11, typically of the Wankel type, is shown including a plurality of trochoidal combustion chambers 13 and a plurality of eccentrically rotated rotors 15. Each of the combustion chambers 13 is connected through an inlet conduit 17 to one or more barrels of a carburetor 19. The present invention assumes the use of plural rotors 15 operating in plural combustion chambers 13, and assumes further that the intake conduit 17 comprises plural conduits, each conduit supplying one or more combustion chamber 13 with fuel mixed with air, and each connected to independent barrels within the carburetor 19. It will be understood that each of the rotors 15 creates a vacuum within its respective combustion chamber 13 during the intake cycle, generating a vacuum in its respective inlet conduit 17, causing air and fuel to be mixed within the carburetor 19 in proper proportions to support combustion.

Figure 2:
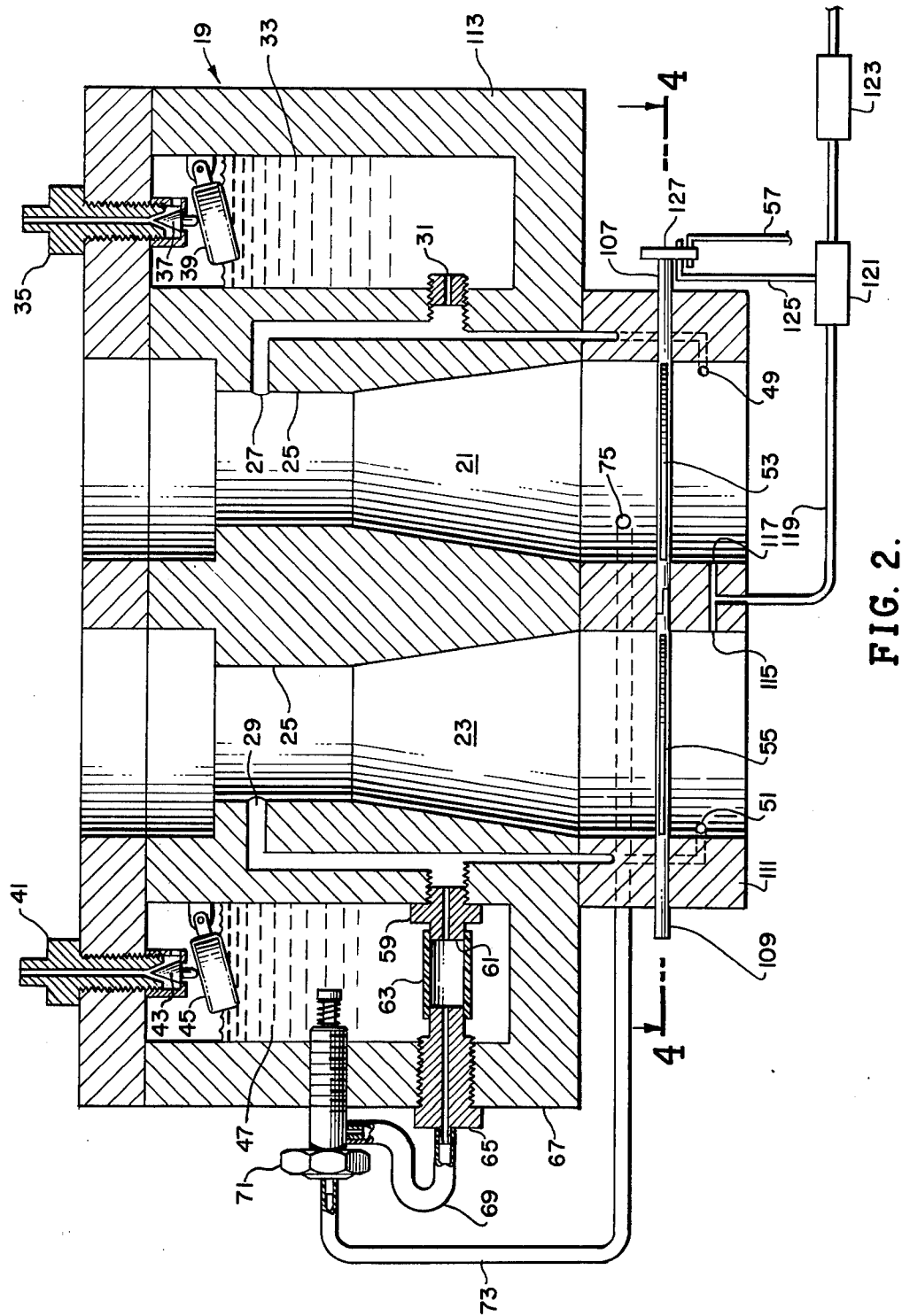
FIG. 2 is a sectional view of the carburetor of FIG. 1 showing the apparatus used to control the fuel and oil flow to each bank of rotors.

Referring now to FIG. 2, the details of construction of the carburetor 19 of the present invention will be described. In this instance, the carburetor includes at least one manually controlled barrel 21 connected to a first intake conduit 17 (manually controlled conduit) of a first group of rotors and a second vacuum controlled barrel 23 connected to a second intake conduit 17 (vacuum controlled conduit) for supplying fuel and air to a second group of rotors 13. Each of the barrels 21 and 23 is constructed to provide a venturi passage 25 for increasing the velocity and thereby decreasing the pressure of airflow at this point in the carburetor. A main fuel jet 27 communicates with the barrel 21 at the venturi 25 to supply fuel to the manually controlled barrel 21. Similarly, a main fuel jet 29 communicates with the venturi 25 of the barrel 23. The main jet 27 communicates through a metering orifice 31 with a fuel reservoir 33. This fuel reservoir 33, in a typical construction, is supplied fuel from a fuel pump (not shown) through a needle valve 35 which includes a needle 37 opened and closed by a float 39 to maintain the reservoir 33 filled with fuel at a predetermined level at all times. A similar needle valve 41, needle 43 and float 45 maintains the level of fuel in a fuel reservoir 47 used to supply fuel to the main jet 29 of the barrel 23. In addition, fuel is supplied to an idling jet 49 through the metering orifice 31 from the reservoir 33 to provide fuel for idling within the carburetor barrel 21. A similar idling jet 51 is connected to the main jet 29 to provide idling fuel for the vacuum controlled barrel 23.

A pair of throttle valves 53 and 55 control the flow of air through the respective carburetor barrels 21 and 23 to control the flow of fuel and air into the respective combustion chambers 13. The throttle valve 53 in the manually controlled barrel 21 is directly controlled by a mechanical linkage 57 connected to the accelerator pedal in the vehicle being driven. The throttle valve 55 is controlled in accordance with the vacuum in the intake manifold connected to the manually controlled barrel 21 in a manner which will be described in detail below.

While in an unmodified carburetor, fuel flow to the main jet 29 and idle jet 51 will be controlled through a metering orifice similar to the orifice 31, a modification is made according to the present invention to replace the metering orifice with a tubular fitting 59 which is rigidly secured, as by threading, into the wall of the fuel reservoir 47. This fitting includes a tubular extension 61 which supports a conduit 63, preferably made of resilient material of smaller diameter of the tubular extensions 61 such that the conduit 63 fits snugly over the tubular extension 61 to provide a fuel-tight connection. The conduit 63 is similarly connected to a tubular fitting 65 which is threaded through the exterior wall 67 of the fuel reservoir 47 at a position directly opposite the fitting 59 to provide a conduit for the flow of fuel to the fitting 59 from outside the carburetor 19. A second conduit 69, preferably of resilient polymeric material, is connected between the fitting 65 and a vacuum actuated fuel control valve 71. As will be described in more detail below, the fuel control valve 71 is in fluid communication with fuel within the fuel reservoir 47 and supplies fuel from the reservoir 47 to the conduit 69 and thus to the fitting 59 and jets 29 and 51 in response to the vacuum in a vacuum sensing line 73. When a relatively high vacuum is present in the conduit 73, the valve 71 closes to prohibit flow of fuel from the fuel reservoir 47 into the conduit 69. When the vacuum in the conduit 73 is reduced to a predetermined level, that is, the pressure within the sensing line 73 is increased, the valve 71 will open to admit fuel from the reservoir 47 to the jets 29 and 51.

The vacuum sensing line 73 is connected to a port 75 which opens at the off-idle position into the manually controlled barrel 21. As used in this application, the off-idle position is a position upstream of the throttle valve 53. When the throttle valve 53 is opened a substantial distance, the vacuum at the off-idle port 75 will be substantially the same as the vacuum within the intake conduit 17 leading to the manually controlled bank of rotors 15, so that the port 75 will monitor engine demand. As the load on the engine increases in response to increased engine demand, the vacuum in the manually controlled intake conduit 17 will decrease, leading to a vacuum decrease in the conduit 73 and a resultant opening of the valve 71 to admit fuel to the jets 29 and 51 to permit operation of the vacuum controlled rotors connected to the barrel 23. When the vacuum within the intake conduit 17 connected to the manually controlled rotors 15 and barrel 21 increases, as would occur, for example, at cruising speeds when engine demand is relatively low, the vacuum in the conduit 73 will increase accordingly, the vacuum at the port 75 being only slightly less than the vacuum in the intake conduit 17, so that the valve 71 will close to prohibit the passage of fuel from the reservoir 47 to the jets 29 and 51. This eliminates combustion in the vacuum controlled bank of combustion chambers 13 connected to the vacuum controlled barrel 23 so that only a portion of the rotors 15 are used to meet this relatively low engine demand.

When the engine is idling, the throttle valves 53 and 55 are closed and fuel for idling is supplied through the idle jets 49 and 51. Lack of airflow through the venturi 25 eliminates the vacuum in the main jets 27 and 29 so that no fuel flows through the main jets. A vacuum is created, however, at the idle jets 49 and 51 in direct response to rotation of the rotors 15, so that fuel is drawn through these idle jets 49 and 51. By placing the vacuum port 75 at the off-idle position upstream of the throttle valve 53, a relatively low vacuum will exist within the vacuum sensing line 73 when these idle conditions exist, since the vacuum port 75 is in direct communication with atmospheric pressure through the barrel 21. This atmospheric pressure will cause the vacuum control valve 71 to open so that fuel is supplied to the idling jet 51 through the conduit 69. Thus, whenever the throttle valve 53 is completely closed, as at idle, the vacuum control valve 71 will operate in a manner identical to its operation at peak engine demand to supply fuel to the vacuum controlled barrel 23. It will be understood by those skilled in the art that air for idling to be mixed with the fuel from the idle jets 49 and 51 is supplied by apertures through the carburetor which are not shown in FIG. 2.

Figure 3:
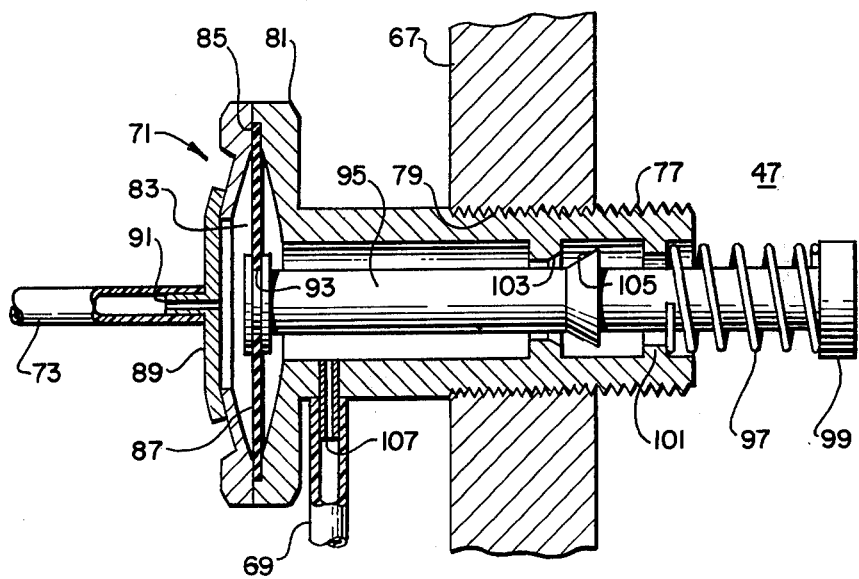
FIG. 3 is a detailed sectional view of the vacuum actuated fuel control valve of FIG. 2.

The details of the vacuum actuated fuel control valve 71 will be explained in reference to FIG. 3. As previously explained, this valve 71 passes through the wall 67 of the fuel reservoir 47 to control the flow of fuel between the fuel reservoir 47 and a flexible conduit 69. The main body of the valve 71 is formed as an externally threaded tubular member 77 which is conveniently threaded through an aperture 79 in the wall 67. The tubular member 77 includes a flange 81 of enlarged diameter which includes a hollow cavity 83. An annular groove 85 surrounding the recess 83 supports a perimeter of a resilient diaphragm 87 which is sealed within the annular groove 85. The exterior of the hollow cavity 83 is sealed by a flange 89 which is attached by any suitable means to the flange 81. The flange 89 includes an extending tubular portion 91 which provides communication to the interior of the cavity 83 and support for the resilient vacuum sensing line 73.

The resilient diaphragm 87 includes a circular central aperture 93 which mounts one end of a reciprocating valve stem 95. The valve stem is attached and sealed to the aperture 93 by any convenient means. The opposite end of the valve stem 95 is mounted on the tubular member 77 by means of a compression spring 97 which bears against a head 99 on the valve stem 95 and an internal annular shoulder 101 at one extremity of the tubular member 77. The spring 97 biases the valve stem 95 to the right, as viewed in FIG. 3. A valve seat 103 is formed within the tubular member 77 and designed to interengage with a valve surface 105 formed as a protruding annular shoulder around the valve stem 95. The spring 97 thus biases the valve stem 95 to the right, as viewed in FIG. 3, so that the valve 105 is biased to an open position. When a predetermined vacuum exists within the vacuum sensing line 73, a pressure differential is generated across the flexible diaphragm 87 which is sufficient to overcome the bias of the spring 97, such that the valve stem 95 moves to the left, as viewed in FIG. 3, engaging the valve surface 105 and valve seat 103.

A tubular member 107 is attached, as by threading, through the wall of the tubular member 77 outside of the wall 67 of the fuel reservoir 47. This member 107 communicates with the interior of the tubular member 77 and supports the fuel supply conduit 69. This fuel supply conduit 69, as previously explained, communicates with the jets 29 and 51 of the vacuum control barrel 23 within the carburetor. The control valve 71 permits fluid flow between the fuel reservoir 47 and the jets 29 and 51 through the tubular member 77 when a relatively low vacuum is present on the vacuum sensing line 73, so that the vacuum controlled rotors within the engine will be supplied with fuel. When the vacuum within the sensing line 73 is relatively high, however, the valve 71 will close, prohibiting fuel flow through the tubular member 77, and thus from the fuel reservoir 47 to the vacuum controlled barrel 23.

Referring once again to FIG. 2, it should be noted that, once the vacuum actuated fuel control valve 71 has closed in response to increased vacuum at the off-idle vacuum port 75, as would occur during vehicle cruising, for example, or any low power demand engine characteristic other than idling, all fuel flow to the jets 29 and 51 is discontinued, since both the main jet 29 and the idle jet 51 are controlled. Thus, when the vacuum controlled barrel 23 is deactivated, sporadic engine firing cannot occur as would be the case, for example, if the idle jet 51 were not properly controlled. This control of both jets therefore eliminates misfiring in the controlled rotor bank and thus eliminates a possible cause of undesirable exhaust emissions from the engine.

In further reference to FIG. 2, the mechanism for controlling the flow of lubricating oil to the carburetor barrels 21 and 23 and thus to the engine rotors 15 will be described. As has been previously noted and will be described in more detail below, the throttle valve 53 is manually controlled through rotation of a shaft 107 by a linkage 57 connected to the accelerator pedal in the vehicle. In order to operate the throttle valve 55 independently of the throttle valve 53, the throttle valve 55 is mounted on an independent rotating shaft 109. Each of the shafts 107 and 109 are conveniently rotatably mounted in a throttle housing 111 mounted by any convenient means to the main carburetor housing 113 and engine 11. In order to provide lubrication for the rotors 15, a pair of oil inlet ports 115 and 117 communicate with carburetor barrels 21 and 23 and are in communication with an oil pressure line 119 which is connected to an oil valve 121. The oil valve 121, conduit 119 and ports 115 and 117 are standard on rotary engines, as is an oil pump 123 which supplies oil under pressure to the lubricating system. The oil valve 121 is designed to control the flow of oil to the ports 115 and 117 in accordance with the throttle valve opening. Thus, by using the throttle valve position, the amount of lubricant supplied to the ports 115 and 117 can be made to increase in response to both the rate of rotation of the rotary engine and engine load. In a typical carburetor configuration the oil valve 121 is controlled from the rotating shaft 109 rather than the rotating shaft 107. In the modification of the present invention, the oil control valve 121 is connected directly, as through a linkage 125, to an eccentric member 127 connected to the rotating shaft 107. This eccentric 127 is connected in turn to the accelerator linkage 57 so that the oil valve 101 always operates in conjunction with the accelerator linkage 57 and the throttle 53 of the barrel 21. As will be explained in detail below, under some circumstances the throttle valve 53 will be open while the throttle valve 55 will be closed. It has been found advantageous to supply oil through both of the ports 115 and 117 under these conditions, since the rotor 13 connected to the carburetor barrel 23 must receive increased oil quantities with increased rotational rates, regardless of whether combustion occurs in this combustion chamber. The modification of attaching the linkage 125 directly to the eccentric 127 accomplishes this result.

Figure 4:
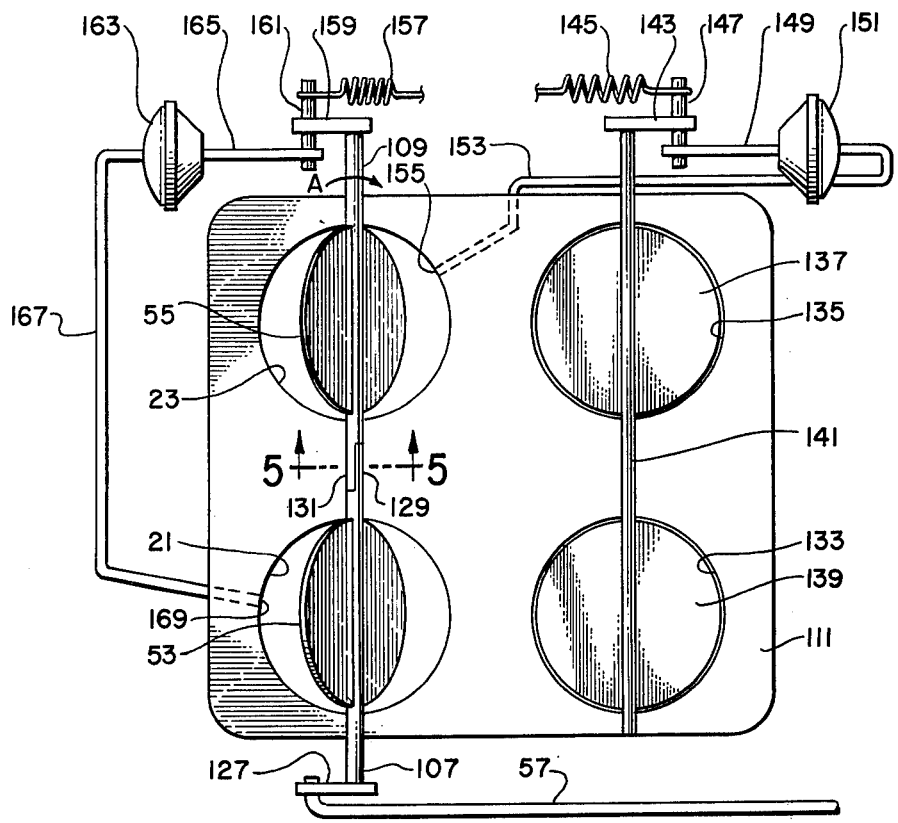
FIG. 4 is a sectional view taken along lines 4—4 of FIG. 2 showing the mechanism used to control the throttle valves in the manually controlled and vacuum controlled intake conduits.
Figure 5:
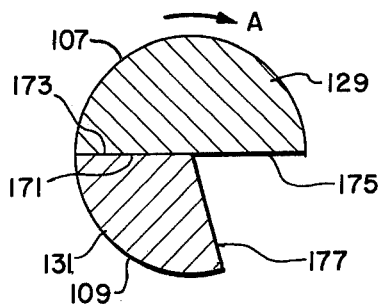
FIG. 5 is a sectional view taken along lines 5—5 of FIG. 4 showing the construction of the interconnection between the throttle valves of the carburetor.

Referring now to FIGS. 4 and 5, the mechanism for operating the throttle valve 53 and 55 will be explained. As previously noted, the throttle valve 53 is rigidly connected to a rotating shaft 107 which is mounted for rotation within the throttle housing 111. The throttle valve plate 55 is likewise rigidly connected for rotation with a rotating shaft 109 mounted in the throttle housing 111. The shafts 107 and 109 are interconnected through respective segmented ends 129 and 131, the operation of which will be described in detail below.

As is common in many carburetor configurations, each of the pair of inlet conduits of the intake manifold 17 is connected to a pair of barrels for changing the carburetor mixture in response to engine demand. Thus, the first inlet conduit 17 which is connected to the carburetor barrel 21 is additionally in communication with a secondary carburetor barrel 133. Likewise, the second intake conduit 17 which is in communication with the carburetor barrel 23 is additionally in communication with a secondary carburetor barrel 135. The carburetor barrels 133 and 135 are controlled by a pair of throttle valves 137 and 139, respectively, each of which is rigidly mounted on a single rotating throttle control shaft 141 supported within the throttle housing 111. The secondary throttle valves 137 and 139 are controlled by means of an eccentric 143 rigidly connected to the rotating shaft 141. A tension spring 145 is mounted on the engine or carburetor housing to bias the eccentric 143 to open the throttle valves 137 and 139. A pin 147 which connects the tension spring 145 to the eccentric 143 is additionally connected by means of an actuating arm 149 to a vacuum transducer 151. This vacuum transducer 151 operates in response to vacuum supplied by a vacuum line 153 which terminates in a vacuum sensing port 155 positioned downstream of the throttle valve 55 in the carburetor barrel 23. As engine demand decreases, the vacuum at the sensing port 155 increases, actuating the transducer 151 to rotate the rod 141 to close the throttle valves 137 and 139, overcoming the bias of the tension spring 145. The carburetor barrels 133 and 135 therefore operate in response to peak engine demand as sensed by a low vacuum at the vacuum port 155 to supply additional fuel and air to the pair of intake conduits 17.

In addition to this control of the secondary throttle valves 137 and 139 which is typically included in four barrel carburetors, a vacuum control is provided for operating the throttle valve 55 in the carburetor barrel 23 independent of the throttle valve 53. In a manner similar to the vacuum control for the rod 141, a tension spring 157 is connected to an eccentric 159 through a pin 161. The tension spring 157 urges the eccentric 159 and its attached rotating rod 109 in a direction which tends to open the throttle valve 55. A vacuum transducer 163 is connected through a linkage 165 to the pin 161 and is additionally connected to a vacuum line 167 which terminates in a port 169 positioned downstream of the throttle valve 53. The port 169 is subjected to a relatively high vacuum when the engine is operating at low demand, so that the transducer 163 holds the throttle valve 55 closed. However, as engine demand increases, the vacuum downstream of the throttle valve 53 within the carburetor barrel 21 decreases, deactuating the transducer 163 to permit the spring 157 to rotate the rod 109 and throttle valve 55 to an open configuration as shown in FIG. 4.

The segmented ends 129 and 131 of the rotating rod 107 and 109 permit this independent rotation of the throttle valves 53 and 55 within certain limitations. Referring specifically to FIG. 5, it will be noted that the segmented portion 129 of the manually controlled rotating rod 107 is formed as a semicircle, while the segmented portion 131 of the vacuum control rod 109 is formed as a smaller segment of a circle. As the rod 107 rotates in response to depression of the accelerator pedal and motion of the accelerator linkage 57, the segmented end 129 rotates in the direction A shown in FIG. 5, such that a first abutting surface 171 of the segmented portion 129 rotates away from a first abutting surface 173 of the segmented portion 131. The segmented portion 131 can thus remain stationary as the segmented portion 129 rotates, permitting the throttle valve 53 to open while the throttle valve 55 remains closed. Once the throttle valve 53 has opened to a predetermined degree, a second abutting surface 175 on the segmented portion 129 will contact a second abutting surface 177 on the segmented portion 131 to assure that, when the throttle valve 53 is opened to its fullest extent, the throttle valve 55 will be manually opened by engagement of the surfaces 175 and 177 to a slight degree. This operation assures that the throttle valve 55 cannot become lodged in the carburetor barrel 23 to a sufficient extent that the spring 157 cannot rotate the throttle valve 55, without intermittently being dislodged manually when the throttle valve 53 is opened completely. Similarly, abutment of the surfaces 173 and 171 assures that, when the engine is idling, that is, when the throttle valve 53 is completely closed, engagement of the segmented portions 129 and 131 will assure that the throttle valve 55 is likewise completely closed. This latter abutment therefore overcomes the operation of the spring 157 and transducer 163 under idle conditions.

Operation of the rotary engine 11 and the carburetor 19 described in reference to FIGS. 1 through 5 will now be explained. When the engine 11 is operating under relatively low power demand, such that the vacuum within the carburetor barrel 21 is relatively high and the throttle valve 53 is opened to some extent by the accelerator linkage 57, the vacuum at both of the sensing ports 75 and 169 will be relatively high. This high vacuum closes the vacuum control valve 71 to prohibit the flow of fuel from the fuel reservoir 47 to the main jet 29 and idle jet 51 of the carburetor barrel 23. Simultaneously, the relatively high vacuum at the vacuum sensing port 169 activates the vacuum transducer 163 to maintain the throttle valve 55 in the carburetor barrel 23 closed. Simultaneously, a high vacuum is created in the carburetor barrel 23 downstream of the throttle valve 55 which is sensed at the vacuum sensing port 155, activating the vacuum transducer 151 to maintain the throttle valves 139 and 137 of the barrels 135 and 133 closed. Thus, under these conditions, only the throttle valve 53 is opened so that only the carburetor barrel 21 operates to supply fuel to only one of the intake conduits 17, and only that portion of the multiple rotors 13 in communication with this inlet conduit 17 will operate to produce output power. This operation on only a portion of the engine rotors 15 efficiently produces power with reduced emissions at low engine demand.

As increased engine demand is produced through further actuation of the accelerator linkage 57, the throttle valve 53 will open to a greater degree. This greater opening of the throttle valve 53 decreases the vacuum within the carburetor barrel 21 so that a decreased vacuum is sensed at the port 169 and vacuum transducer 163. In response to this decreasing vacuum, the vacuum transducer 163 becomes deactivated, permitting the tension spring 157 to open the throttle valve 55 to permit operation of the carburetor barrel 23 and the remaining inlet conduit 17 connected to the previously deactivated rotors 15. Simultaneously, the vacuum sensing port 75 monitors this decreasing vacuum to actuate the vacuum actuated fuel control valve 71 to open and supply fuel from the fuel reservoir 47 to the main jet 29 and idle jet 51. Fuel is thus supplied to the carburetor barrel 23, and the throttle valve 55 is opened so that the remaining rotors are activated.

In response to further increases in engine demand, the vacuum within the carburetor barrel 23 will be reduced to a greater extent such that the vacuum sensed at the port 155 will deactivate the vacuum transducer 151 permitting the tension spring 145 to open the throttle valves 137 and 139. The carburetor barrels 135 and 133 are supplied with fuel from the fuel reservoirs 33 and 47 by conduits and jets (not shown) which are independent from the conduits and jets which supply the barrels 23 and 21. Thus, the remaining carburetor barrels 135 and 133 supply increased amounts of air and fuel to the pair of inlet conduits 17 to produce peak power required under these characteristics.

When the accelerator linkage 57 is moved to an idle position, closing the throttle valve 53, engagement of the segmented portions 129 and 131 of the rotating rods 107 and 109 will force the throttle valve 55 to a closed or idle position overcoming the tension spring 157 and vacuum transducer 163. The vacuum sensing port 155 located downstream of the throttle valve 55 will monitor a relatively high vacuum under idling conditions such that the vacuum transducer 151 will maintain the throttle valves 139 and 137 in a closed position so that the barrels 135 and 133 do not operate. Thus, at idle, each of the throttle valves 53, 55, 139 and 137 is closed. The vacuum sensing port 75, being positioned above the throttle valve 53, is disassociated from the vacuum within the barrel 21 below the throttle valve 53 and is thus subjected to atmospheric pressure. This causes the vacuum actuated fuel control valve 71 to open, admitting fuel to the conduit 69. Since there is no airflow through the venturi portion 25 of the carburetor barrel 23, fuel will not flow through the main jet 29. Fuel will be drawn by the vacuum below the throttle valve 55 through the idle jet 51 to support idling combustion in the rotors 15 connected to the carburetor barrel 23. Thus, under idle conditions, all of the combustion chambers 13 will be supplied with fuel from the carburetor barrels 21 and 23 so that normal idling characteristics are achieved.

It should be recognized that, through a variation in the spring constant or pretension of the springs 157 and 145 the vacuum level at which the throttle valves 55, 139 and 137 can be operated may be varied. Similarly, through a variation in the spring constant or pretension of spring 97 in the vacuum control valve 71, the vacuum at which the control valve 71 will close to prohibit fuel flow to the barrel 23 may be varied. Thus, the spring tensions may be varied to produce a gradual transition from operation on one bank of rotors to both banks of rotors at a preselected engine demand and to then undergo a second transition at even more increased engine demand through the opening of the throttle valves 137 and 139.

In addition, it has been found advantageous to adjust the relative operating vacuums of the valve 71 and throttle valve 55 such that the valve 71 operates at a lower vacuum level. Thus, as the vacuum decreases in the barrel 21, the throttle valve 55 will initially close to eliminate flow of air to the secondary bank of rotors except through the idle jet 51. Sporadic combustion will not occur under these conditions and it is possible then to interrupt the fuel altogether through a closing of the fuel control valve 71. If this operation were reversed, such that upon decreasing vacuum in the carburetor barrel 21 the vacuum actuated fuel control valve 71 closed prior to the closure of the throttle valve 55, fuel left in the conduit between the main jet 29 and idle jet 21 would be sucked out of the main jet 29 to cause sporadic firing of the engine which would generate high emissions and uneven engine performance.

The lubrication system which has been disclosed, wherein the rotors are lubricated regardless of whether fuel is admitted by controlling the oil valve from the accelerator linkage directly assures that the modification to the rotary engine resulting in a splitting of the rotors does not change the engine life. In addition, it should be understood that the amounts of oil normally admitted to a rotary engine combustion chamber are so small that no substantial oil buildup will occur in the deactivated rotor during cruising.

What is claimed is:
1. A rotary engine, comprising:
   first and second combustion chambers;
   first and second rotors mounted for rotation in said first and second combustion chambers, respectively;
   first and second intake manifolds connected to said first and second combustion chambers, respectively, for supplying fuel and air to said combustion chambers;
   first and second carburetor barrels connected to said first and second intake manifolds, respectively;
   first and second throttle valves mounted within said first and second carburetor barrels, respectively, for controlling the flow of air to said first and second intake manifolds;

means for supplying fuel to said first and second carburetor barrels;

means for sensing the vacuum in said first carburetor barrel upstream of said first throttle valve;

means responsive to said sensing means for controlling said fuel supplying means to selectively prohibit fuel flow to said second carburetor barrel when the vacuum above the primary throttle valve is below a pre-selected amount;

means for monitoring the vacuum in said first intake manifold; and means responsive to said monitoring means for controlling said second throttle valve in response to the vacuum in said first intake manifold.

2. A rotary engine as defined in claim 1 additionally comprising:

means for pumping lubricant into said first and second intake manifolds for lubricating said first and second rotors; and means for controlling said pumping means and thereby controlling the supply of lubricant to both said first and second rotors in response to the position of said first throttle valve.

3. A rotary engine as defined in claim 1 additionally comprising:

first and second fuel reservoirs for supplying fuel to said first and second carburetor barrels;

said means for supplying fuel comprising:

first and second main fuel jets for introducing fuel into each of said first and second carburetor barrels; and a pair of conduits leading from each of said first and second reservoirs to said first and second jets;

said means for controlling said fuel supplying means comprising a vacuum actuated fuel control valve in said second conduit between said second jet and said second reservoir.

4. A rotary engine as defined in claim 3 additionally comprising:

first and second idle jets for supplying idling fuel to each of said first and second carburetor barrels, the fuel supply to said second idle jet supplied by said second conduit and controlled by said vacuum actuated fuel control valve.

5. In a rotary engine having first and second rotors operating in first and second combustion chambers connected by first and second manifolds to first and second carburetor barrels, wherein each of said carburetor barrels includes a throttle valve and a fuel inlet port connected to a fuel reservoir, the improvement comprising:

a vacuum sensing port in said first carburetor barrel upstream of said throttle valve;

a valve connected to said sensing port and operating in response to the vacuum upstream of said throttle valve, said valve controlling flow between the fuel reservoir and fuel inlet port of said second carburetor barrel;

a second vacuum sensing port in said first carburetor barrel downstream of said throttle valve; and means connected to said second sensing port for controlling the position of the throttle valve of said second barrel in response to the downstream vacuum of said first carburetor barrel.

6. A rotary engine as defined in claim 5 additionally comprising:

means for supplying lubricant to both of said first and second manifolds in response to the position of said throttle valve located in said first carburetor barrel.

7. A rotary engine as defined in claim 5 additionally comprising:

idle fuel inlet ports located downstream of said throttle valves in each of said first and second carburetor barrels, said idle fuel inlet port of said second carburetor barrel being controlled by said valve.

8. An engine having first and second combustion chambers, each connected by independent intake manifolds to first and second carburetor barrels, said carburetor barrels each including a throttle valve, said engine comprising:

first sensing means for monitoring the vacuum downstream of a throttle valve within said first carburetor barrel;

second sensing means for monitoring the vacuum upstream of a throttle valve within said first carburetor barrel;

means for controlling said throttle valve of said second carburetor barrel in response to said first sensing means; and means for selectively supplying fuel to said second carburetor barrel in response to said second sensing means.

9. Apparatus for controlling the flow of fuel to a multiple combustion chamber internal combustion engine having at least first and second combustion chambers, comprising:

first and second intake manifolds connected respectively to said first and second combustion chambers for conducting air and fuel thereto;

first and second throttle valves controlling air intake respectively to said first and second intake manifolds;

first and second main jet means for supplying fuel for power respectively to said first and second manifolds upstream of said throttle valves;

first and second idle jet means for supplying fuel for idling respectively to said first and second manifolds downstream of said throttle valves;

first sensing means for sensing the vacuum in said first manifold downstream of said first throttle valve;

second sensing means for sensing the vacuum in said first manifold upstream of said first throttle valve;

means for closing said second throttle valve responsive to a high vacuum at said first sensing means and opening said second throttle valve responsive to a low vacuum at said first sensing means;

means for blocking fuel supply to said second idle jet means responsive to a high vacuum at said second sensing means and causing fuel to be supplied to said second idle jet means responsive to a low vacuum at said second sensing means for causing said second idle jet means to provide fuel for idling to said second intake manifold when said engine is idling and both said throttle valves are closed.

* * * * *

UNITED STATES PATENT AND TRADEMARK OFFICE
CERTIFICATE OF CORRECTION

PATENT NO. : 4,070,994
DATED : January 31, 1978
INVENTOR(S) : Arthur Garabedian

It is certified that error appears in the above-identified patent and that said Letters Patent are hereby corrected as shown below:

Column 7, line 15, change "101" to --121--.

Signed and Sealed this

Twentieth Day of June 1978

[SEAL]

Attest:

RUTH C. MASON
Attesting Officer

DONALD W. BANNER
Commissioner of Patents and Trademarks